Nov. 17, 1936.  R. C. McCLAY  2,061,202
COMBINED MOTION PICTURE PROJECTOR AND SOUND REPRODUCER
Filed Oct. 3, 1932
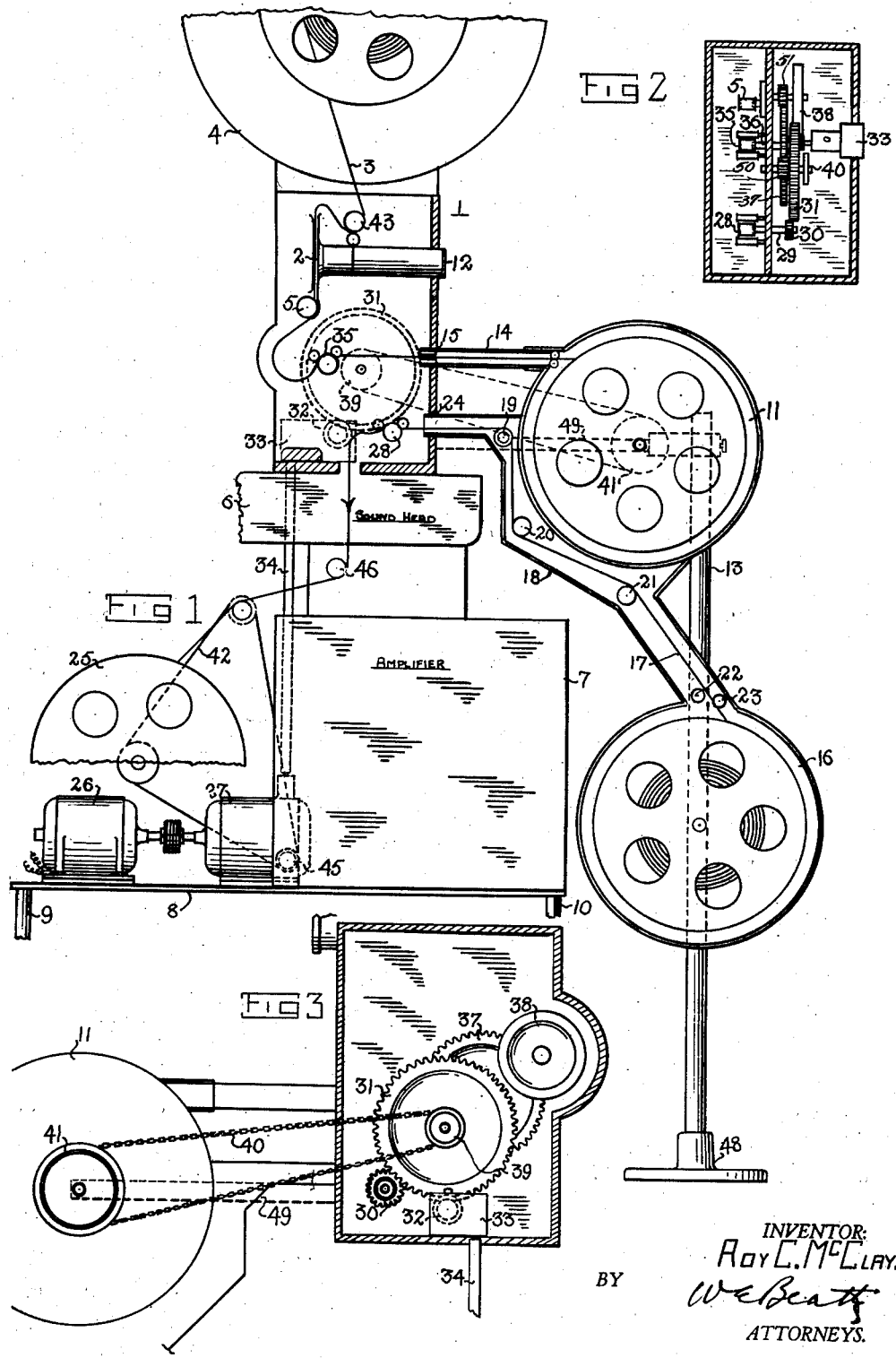
INVENTOR:
Roy C. McClay.
BY W. E. Beatty
ATTORNEYS.

Patented Nov. 17, 1936

2,061,202

UNITED STATES PATENT OFFICE 2,061,202

COMBINED MOTION PICTURE PROJECTOR AND SOUND REPRODUCER

Roy C. McClay, Hollywood, Calif., assignor to United Research Corporation, Long Island City, N. Y., a corporation of Delaware Application October 3, 1932, Serial No. 635,965

2 Claims. (Cl. 88—16.2)

This invention relates to apparatus for simultaneously reproducing sounds from a sound film in synchronism with pictures projected from a motion picture film.

As is well understood, the sound and picture records may be recorded either on a single film or on separate films as required by the type of reproducer in use. In the past, it has been impossible to reproduce both sound and picture from either a single record or from a double record at will, on the same standard machine.

The principal object of the present invention is to reproduce sound in synchronism with pictures in a single machine so that either a film bearing a sound and picture record or separate sound and picture films may be reproduced therefrom with equal facility.

This is accomplished by leading the picture film from the conventional supply reel, past the film gate and intermittent movement, over the usual drive sprocket and through a wall in the projector onto a film takeup reel. The sound film is led from a supply reel through a wall of the projector, over a constant drive sprocket and through the sound head in the conventional manner, being wound up on the usual takeup reel mounted adjacent the sound amplifier. The picture film takeup reel and the sound supply reel have a mounting therefor, independent of the reproducer.

Another object of the invention is to drive two films synchronously and independently of each other through the projector.

This is accomplished by providing a pair of spaced synchronously coupled driving sprockets in the projector head. One is the conventional main drive sprocket, located adjacent the intermittent movement. The other is a constant drive sprocket for the sound film, mounted adjacent the sound head.

Other objects and structural details of this invention will be apparent from the following description when read in conjunction with the accompanying drawing, wherein:

Figure 1 is a side elevation with parts broken away of a preferred assembly of apparatus to be used in this invention.

Figure 2 is a plan view partly in cross-section of the train of gears used to drive the mechanism of this invention.

Figure 3 is a side elevation of the gear train as shown in Figure 2.

When a motion picture is being produced, it is sometimes found necessary to photograph the same scene twice or even three times for various reasons, such as incorrect lighting, etc., which will be apparent to one skilled in the art. At the same time the motion picture is being photographed, the sound is being recorded in synchronism on a separate strip of film. In order to make a release print for public exhibition, all of these "takes" and "retakes" must be projected so that the director may edit and pick out those portions which are best suited to make the complete story. One must project both picture and the accompanying sound films synchronously and simultaneously. The method utilized at the moment is very costly and cumbersome, for besides the standard projecting unit to reproduce the silent film, a separate unit or "film dummy" machine is necessary to reproduce the sound film. These two units are synchronously coupled by means of an electrical interlock, entailing besides the added reproducing unit, certain motor equipment. The added expense and equipment is augmented by construction expense necessary for the installation of this equipment. This is avoided by the present invention wherein a unitary machine is provided for reproducing from separate sound and picture films.

Referring to the drawing, the picture projector 1 is of the conventional type, having a picture gate 2 through which a motion picture film 3 is drawn from a supply reel 4 by means of a suitable intermittent movement 5. A sound reproducing unit 6, of conventional type, is located adjacent the projector 1, as is well understood in the art. A sound amplifier 7 is provided adjacent the sound head 6. The whole of this assembly is supported by a table 8, having supporting legs 9 and 10. A takeup reel 11 for the picture film 3 is located directly in front of the projector 1 below the optical system 12. Reel 11 is supported by a bracket 49 attached at one end to the projector 1 and at the other end to a column 13. Reel 11 is connected to the projector 1 by means of a fire trap 14, passing through an aperture 15 in the front wall thereof. Column 13 rests on a pedestal 48 and is supported independently of supporting table 8. A supply reel 16 for a sound film 17 is also supported by column 13. These reels, 11 and 16 are thus supported independently of the sound head 6 and amplifier 7. Sound film 17 is led into the projector 1 through a fire trap 18, having guiding rollers 19, 20, 21, 22 and 23 therein. A projecting portion of the fire trap 18 passes through an aperture 24 in the front wall of the projector 1. There is a conventional takeup reel 25 for the sound film 17 adjacent amplifier 7. The protective coverings for the various film supply and takeup reels and fire traps have been omitted from the drawing for the sake of clarity.

Power is supplied to the moving parts of the apparatus by means of an electric motor 26, coupled to a gear box 27, which rest on the base 8.

A drive sprocket 28 is located in the projector head 1 adjacent the aperture 24. Sprocket 28 is mounted on one end of a drive shaft 29 to the other end of which is attached a pinion gear 30. Gear 30 meshes with a larger gear 31 and is of such a ratio thereto, that sprocket 28 will be rotated at a constant pre-determined speed. Gear 31 is driven by a pinion gear 32 which is in turn driven by a train of gears (not shown) in a reduction gear box 33. Power is supplied to reduction gear box 33 through a flexible shaft 34 connected to the gear box 27. A conventional drive sprocket 35 is mounted on one end of a shaft 36, on the other end of which is mounted a gear 37, driven by gear 31. From the above it will be apparent that sprockets 28 and 35 are so arranged that they each drive a separate film through the projector in opposite directions.

Sprocket 5 imparts intermittent movement to the picture film by any suitable means such as a Geneva movement (not shown). A suitable flywheel 38, driven by gear 37, eliminates vibration and gear chatter from the apparatus as is well understood. A pulley 39 is mounted on one end of the drive shaft 40 of gear 31 and imparts movement to the takeup reel 11 through a suitable belt drive 40 and a second pulley 41 mounted on the reel 11. The takeup reel 25 is rotated by a conventional triangular endless belt 42 interacting with a drive pulley 45 mounted on the side of gear box 27.

In the operation of this device the picture film 3 is drawn from the supply reel 4, passes over an idler roller 43, through the film gate 2 and on to sprocket 5 which imparts intermittent movement thereto, then passes over constant drive sprocket 35, through the aperture 15 in the forward wall of the projector 1, through the fire trap 14 and on to the takeup reel 11. The sound film 17 is drawn from the supply reel 16, through the fire trap 18 by the constant drive sprocket 28, and passes in the conventional manner through the sound head 6, over an idler roller 46 and is wound up on the takeup reel 25.

When it is desired to run a single film bearing a sound and picture record thereon through the apparatus, the film is led from the supply reel 4 over the idler 43, past the film gate 2, around the intermittent movement 5, over the constant drive sprocket 35, through the sound head in the conventional manner, and is received by the takeup reel 25.

Thus it will be seen that the present invention reduces the cost of manufacture of motion picture film through this simple apparatus whereby either a single film bearing a sound and picture record, or a double film may be reproduced with equal facility by the same apparatus.

Having thus described the invention what is claimed as new and desired to secure by Letters Patent is:

1. A double film attachment for a sound and picture projector having a plurality of film apertures formed in vertical alignment in one side wall thereof, said attachment comprising a supporting element separate from the projector support, two film magazines supported upon said element in vertically spaced relation, a fire trap conduit extending from the upper film magazine to the upper aperture, and a second fire trap conduit having a portion extending from the lower film magazine to the upper magazine, a second portion secured to the upper magazine and a third portion extending from the upper magazine to the lower aperture.

2. A unitary double film attachment for a sound and picture projector comprising, a supporting standard separate from the projector, two film magazines supported upon said standard in vertically spaced relation, a fire trap conduit extending laterally from the upper magazine, a second fire trap conduit having a terminal portion extending from the upper magazine substantially parallel with the first conduit, an intermediate portion secured to and supported by said upper magazine and another terminal portion extending from the upper magazine to the lower magazine.

ROY C. McCLAY.